(12) United States Patent
Ozan et al.

(10) Patent No.: US 9,696,441 B2
(45) Date of Patent: *Jul. 4, 2017

(54) APPARATUS AND METHOD FOR PREDICTING VERTICAL STRESS FIELDS

(71) Applicants: Cem Ozan, Houston, TX (US); Martin Brudy, Houston, TX (US); Wouter Van der Zee, Voorburg (NL)

(72) Inventors: Cem Ozan, Houston, TX (US); Martin Brudy, Houston, TX (US); Wouter Van der Zee, Voorburg (NL)

(73) Assignee: BAKER HUGHES INCORPORATED, Houston, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/702,101

(22) Filed: May 1, 2015

(65) Prior Publication Data

US 2015/0234068 A1 Aug. 20, 2015

Related U.S. Application Data

(60) Division of application No. 13/012,992, filed on Jan. 25, 2011, now Pat. No. 9,051,815, which is a continuation-in-part of application No. 12/568,094, filed on Sep. 28, 2009, now Pat. No. 8,214,152.

(51) Int. Cl.
*G01V 1/30* (2006.01)

(52) U.S. Cl.
CPC .................... *G01V 1/303* (2013.01)

(58) Field of Classification Search
USPC .......................................... 702/11
See application file for complete search history.

(56) References Cited

U.S. PATENT DOCUMENTS

| 4,981,037 | A | 1/1991 | Holbrook et al. |
| 5,200,929 | A | 4/1993 | Bowers |
| 5,282,384 | A | 2/1994 | Holbrook |
| 6,308,787 | B1 | 10/2001 | Alft |
| 6,434,487 | B1 | 8/2002 | Thompson et al. |
| 6,968,274 | B2 | 11/2005 | Tutuncu et al. |
| 8,214,152 | B2 * | 7/2012 | Ozan ............ G01V 11/00 702/11 |
| 2004/0145969 | A1 | 7/2004 | Bai et al. |

(Continued)

FOREIGN PATENT DOCUMENTS

WO 2007061989 A1 5/2007

OTHER PUBLICATIONS

M.D. Zoback, Determination of stress orientation and magnitude in deep wells, 2003 Elsevier Ltd., International Journal of Rock Mechanics & Mining Sciences 40 (2003) 1049-1076.*

(Continued)

*Primary Examiner* — Tung Lau
(74) *Attorney, Agent, or Firm* — Cantor Colburn LLP

(57) ABSTRACT

A method of estimating stress in an earth formation is disclosed. The method includes: dividing a domain including at least a portion of an earth formation into a first region and a second region; estimating a first vertical stress in the first region and representing the first vertical stress as at least one point load; estimating a second vertical stress in the second region by a point load based method using the first vertical stress; and estimating at least one horizontal stress based on the second vertical stress.

12 Claims, 9 Drawing Sheets

(56) References Cited

U.S. PATENT DOCUMENTS

| | | |
|---|---|---|
| 2005/0145387 A1 | 7/2005 | Hocking |
| 2007/0118292 A1 | 5/2007 | Moos |
| 2010/0149918 A1 | 6/2010 | Heliot et al. |

OTHER PUBLICATIONS

Albin, et al. "Calculation of Vertical Stress Exerted by Topographic Features". Report of Investigations/1992. United States Department of the Interior; 38 pages.

Amadei, et al. "Gravitational Stresses in Anisotropic Rock Masses with Inclined Strata". Int. J. Rock Mech. Min. Sci. & Geomech. Abstr. vol. 29, No. 3, pp. 225-236-, 1992.

Amadei, et al. "Gravity-induced Stresses in Stratified Rock Masses". Rock Mechanics and Rock Engineering 21, 1-20 (1988).

Liu, et al. "The Effect of Topography on the State of Stress in the Crust: Application to the Site of the Cajon Pass Scientific Drilling Project". Journal of Geophysical Research, vol. 97, No. B4. pp. 5095-5108, Apr. 10, 1992.

Martel, et al. "A Two-dimensional Boundary Element Method for Calculating Elastic Gravitational Stresses in Slopes". Pure appl. geophys. 157 (2000) 989-1007.

Martin, et al. "Stress Heterogeneity and Geological Structures". Int. J. Rock. Mech. Min. Sci. & Geomech. Abstr. vol. 30, No. 7, pp. 993-999, 1993.

Notification of Transmittal of the International Search Report and the Written Opinion of the International Searching Authority, or the Declaration; PCT/US2010/0502291; Mailed Mar. 17, 2011, 3 pages.

Notification of Transmittal of the International Search Report and the Written Opinion of the International Searching Authority, or the Declaration; PCT/US2012/022321; Mailing Date Aug. 27, 2012, 9 pages.

Pan, et al. "Gravitational Stresses in Long Symmetric Ridges and Valleys in Anisotropic Rock". Int. J. Rock Mech. Min. Sci. & Geomech. Abstr. vol. 31, No. 4, pp. 293-312, 1994.

Sheorey, et al. "A Theory for In Situ Stresses in Isotropic and Transversely Isotropic Rock". Int. J. Rock Mech. Min. Sci. & Geomech, Abstr. vol. 31, No. 1. pp. 23-34, 1994.

Williams, Charles A., et al. "An accurate and efficient method for including the effects of topography in three-dimensional elastic models of ground deformation with applications to radar interferometry". Journal of Geophysical Research, vol. 105, No. B; 18 pages.

* cited by examiner

APPARATUS AND METHOD FOR PREDICTING VERTICAL STRESS FIELDS

CROSS-REFERENCE TO RELATED APPLICATIONS

This application is a divisional of U.S. application Ser. No. 13/012,992, filed on Jan. 25, 2011, which is a continuation in part of U.S. application Ser. No. 12/568,094, filed on Sep. 28, 2009, the disclosures of which are incorporated by reference herein in their entirety.

BACKGROUND

Determination of pore fluid pressure is an important aspect of subterranean drilling, exploration and completion operations. Determination of pore fluid pressure is important in maintaining proper fluid pressures to maximize the effectiveness of drilling, production or other operations. For example, the drilling fluid pressure applied by drilling fluid pumped downhole through a drillstring must be sufficient to control hydrostatic pressure in a wellbore to prevent blowouts and maintain optimum drilling rates.

Typically, the pore fluid pressure at a point in a formation has been calculated by considering a difference between total vertical and effective vertical stress at the point of interest. Conventionally, total vertical stress is estimated by vertical integration of density data. On the other hand, there are different approaches for estimation of effective vertical stresses.

Total vertical stress distribution in the Earth may be affected by many factors including surface topology and density heterogeneities. The effect of these factors on total vertical stresses decays with depth below the surface or below the heterogeneity. For example, total vertical stresses are significantly affected by topology close to the surface, but with increasing depth, they approach the stress distribution for a horizontal surface at average elevation.

Conventionally used vertical integration of density implicitly assumes that the gravitational load of an infinitesimal rock element is completely transferred to the element below it. As a result of this assumption, the influence of the gravitational load of an element on the vertical stress distribution does not decay with depth but is transferred to all the elements below it. Depending on the surface topography and density distribution, this assumption can result in overestimation or underestimation of the total vertical stresses and in turn, overestimation or underestimation of the formation pore pressures derived from the total vertical stresses.

BRIEF DESCRIPTION

Disclosed herein is a method of estimating stress in an earth formation. The method includes: dividing a domain including at least a portion of an earth formation into a first region and a second region; estimating a first vertical stress in the first region and representing the first vertical stress as at least one point load; estimating a second vertical stress in the second region by a point load based method using the first vertical stress; and estimating at least one horizontal stress based on the second vertical stress.

Also disclosed herein is a system for estimating stress in an earth formation. The system includes a tool configured to at least one of generate and receive density information for the earth formation, and the tool is configured to perform: dividing a domain including at least a portion of an earth formation into a first region and a second region; estimating a first vertical stress in the first region and representing the first vertical stress as at least one point load; estimating a second vertical stress in the second region by a point load based method using the first vertical stress; and estimating at least one horizontal stress based on the second vertical stress.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
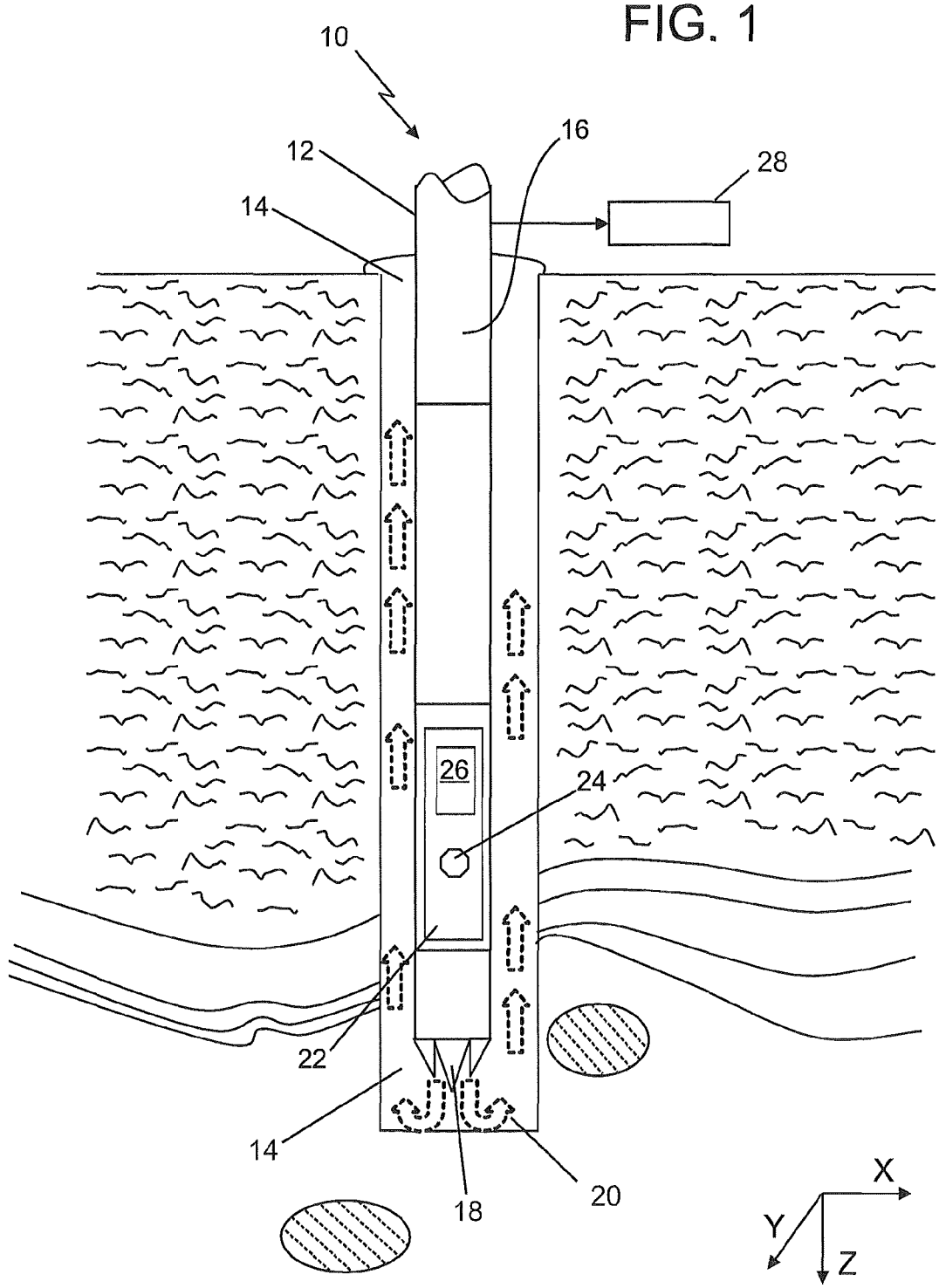
FIG. 1 depicts an exemplary embodiment of a well drilling, production and/or logging system.

Referring to FIG. 1, an exemplary embodiment of a portion of a well drilling, production and/or logging system 10 includes a conduit or string 12, such as a drillstring or production string. The string 12 is configured to be disposed in a borehole 14 for performing operations such as drilling the borehole 14, making measurements of properties of the borehole 14 and/or the surrounding formation downhole, and facilitating hydrocarbon production. As a matter of convention, a depth of the borehole 14 is described along a z-axis, while a cross-section is provided on a plane described by an x-axis and a y-axis.

In one example, the drill string 12 includes lengths of drill pipe or drill segments 16 which drive a drill bit 18. Drilling fluid 20 is pumped or otherwise flows through the drill string 12 toward the drill bit 18, and exits into the borehole 14. The drilling fluid 20 (also referred to as "drilling mud") generally includes a mixture of liquids such as water, drilling fluid, mud, oil, gases, and formation fluids as may be indigenous to the surroundings.

The string 12 may include equipment therein such as a logging instrument or logging tool 22 for performing various measurements of the borehole, downhole components and/ or the formation. In one embodiment, the logging tool 22 is configured as a "measurement while drilling" (MWD) or "logging while drilling" (LWD) tool. In another embodiment, the logging tool 22 is configured to be lowered into the borehole 14 after drilling, such as by a cable or wireline. Exemplary tools 22 include sensors for generating data such as resistivity, density, gamma ray, pressure, seismic, strain and stress data. In one embodiment, the tool 22 is configured to collect and/or process data for predicting or estimating a vertical stress field and/or pore fluid pressures of the formation.

The logging tool 22 includes at least one sensor 24 for sensing various characteristics of the borehole 14, the formation and/or downhole components. In one embodiment, the at least one sensor 24 is in communication with downhole electronics 26 that may receive input from the sensor 24 and provide for at least one of operational control and data analysis. The downhole electronics 26 may include, without limitation, a power supply, a transformer, a battery, a processor, memory, storage, at least one communications interface and the like.

In one embodiment, the logging tool 22, sensor 24 and/or electronics 26 are operably coupled in communication with surface equipment 28. The surface equipment 28 may provide power to the tool 22 and/or other downhole components, as well as provide computing and processing capabilities for at least one of control of operations and analysis of data. A communications channel is included for communication with the surface equipment 28, and may operate via pulsed mud, wired pipe, and other technologies as are known in the art.

In one embodiment, the system 10 is operably connected to a downhole or surface processing unit, such as surface equipment 28, which may act to control various components of the system 10, such as drilling, logging and production components or subs. Other components include machinery to raise or lower segments and to operably couple segments, and transmission devices. The downhole or surface processing unit may also collect and process data generated by the system 10 during drilling, production or other operations.

Figure 2:
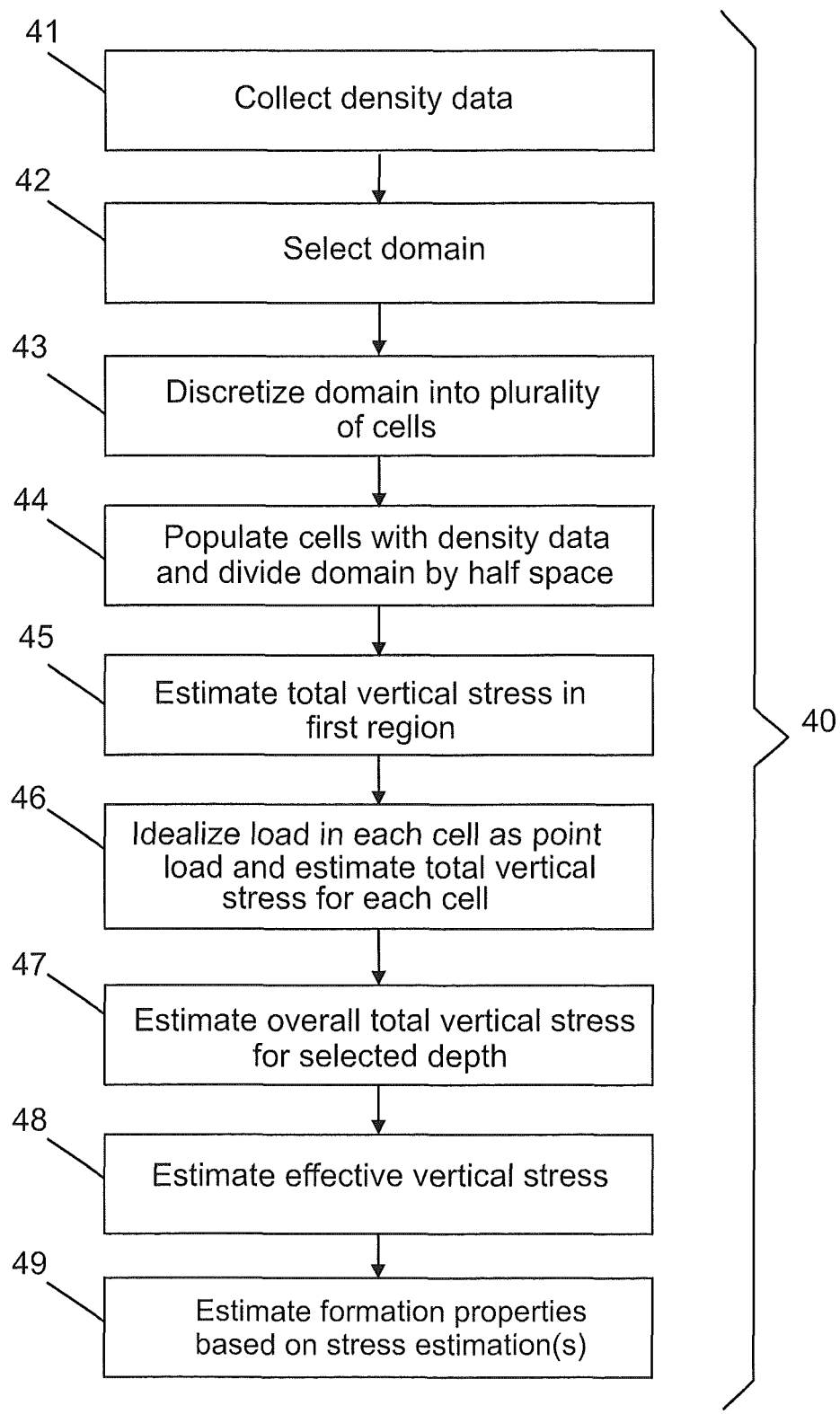
FIG. 2 depicts a flow chart providing an exemplary method of predicting a force such as vertical stress and/or formation pore fluid pressure in an earth formation.

FIG. 2 illustrates a method 40 of predicting or estimating a force in an earth formation. Such a force includes stress and pressure, such as the vertical stress field and/or formation pore fluid pressures in an earth formation. Prediction of the vertical stress field and/or formation pore fluid pressures includes estimating the total vertical stress of the formation. In this method, estimation of total vertical stress includes a calculation approach utilizing the Boussinesq's solution for a point load on a half space.

The method 40 includes one or more stages 41-49. The method 40 is described herein in conjunction with the system 10, although the method 40 may be performed in conjunction with any number and configuration of sensors, tools, processors or other machinery. The method 40 may be utilized as a workflow or as part of one or more workflows, such as vertical stress, pore fluid pressure and horizontal stress estimation workflows. In one embodiment, the method 40 includes the execution of all of stages 41-49 in the order described. However, certain stages may be omitted, stages may be added, or the order of the stages changed.

In the first stage 41, density data is calculated or measured at various depths (z-axis locations). In one embodiment, data is collected at each selected depth at a plurality of x-axis and/or y-axis locations. The plurality of x-axis and/or y-axis locations may correspond to sensor locations in one or more boreholes 14 and/or in a sensor array disposed with the tool 22. Density data may be measured or calculated by any of various suitable methods. In one embodiment, density information is received via downhole sensors or tools such as the logging tool 22. Density information may be collected and/or derived from, for example, log data and seismic information. For example, density data can be estimated using seismic velocity information such as a seismic velocity cross-sections and/or cubes. In one embodiment, density data is estimated from data generated by one or more gamma ray detectors. Methods of collecting density information are not limited to those described herein. Any suitable method for gathering, estimating, calculating or otherwise deriving density data for a formation may be used.

Figure 3:
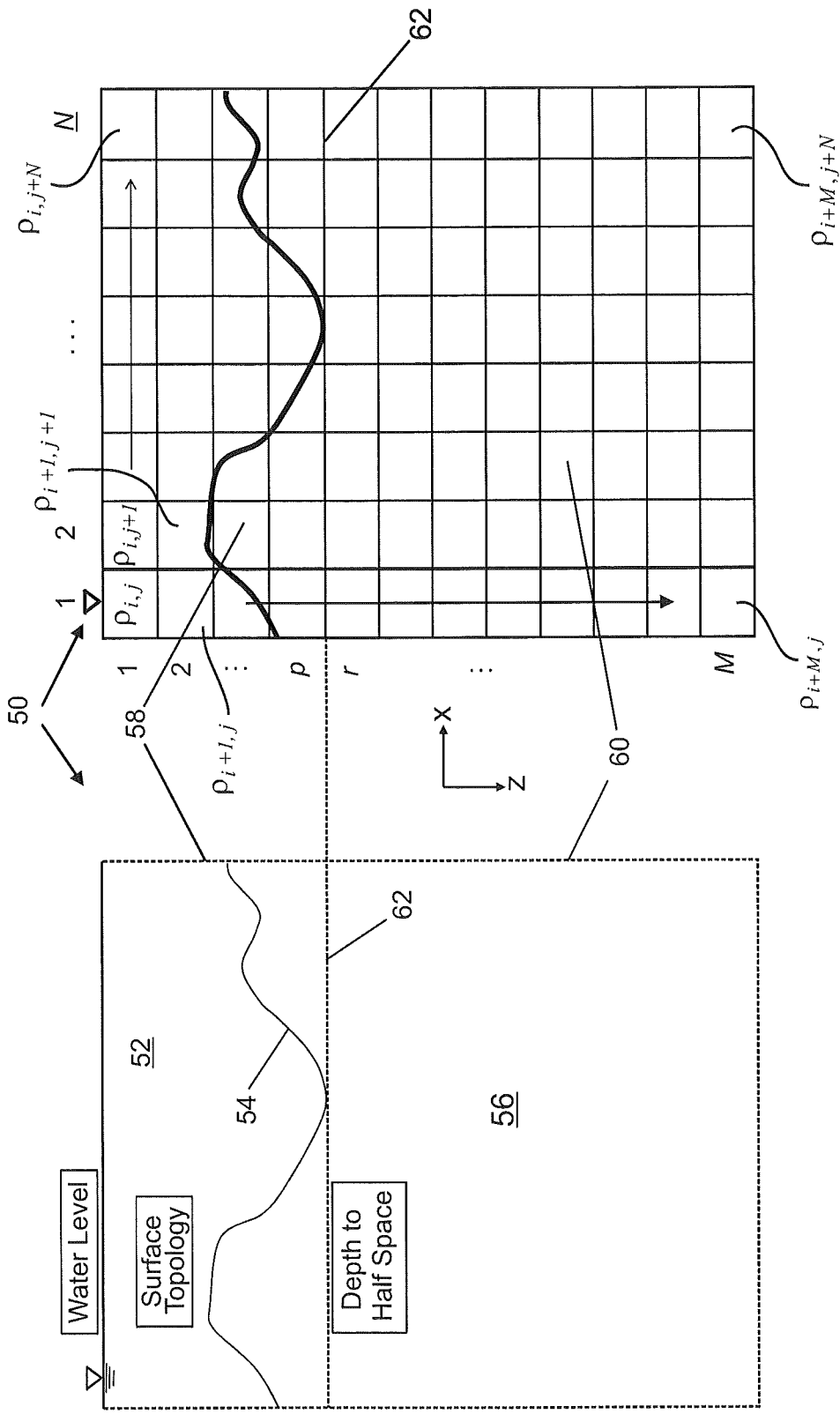
FIG. 3 depicts a cross-sectional view of a domain including an earth formation and an associated density data matrix.

In the second stage 42, referring to FIG. 3, a region or domain 50 is selected that includes locations at which density data has been generated. In one embodiment, the domain 50 is a two-dimensional plane. In another embodiment, the domain 50 is a three-dimensional region. For convention purposes, the domain 50 has a z-axis corresponding to a depth of the location, and an x-axis and/or y-axis that is orthogonal to the z-axis. In one embodiment, the domain 50 includes a surface region 52 including a surface topology 54 and a subterranean region 56.

In the third stage 43, the domain 50 is discretized into a plurality of cells forming a matrix. In one embodiment, the domain is two-dimensional and the cells are rectangular cells having dimensions referred to as "$\Delta x$" and "$\Delta z$". The matrix includes a number of rows "M" in the z-direction and a number of columns "N" in the x-direction.

In another embodiment, the domain 50 is three-dimensional and the cells are rectangular prism cells having dimensions "$\Delta x$", "$\Delta y$", and "$\Delta z$". In this embodiment, the matrix includes a number of rows "M" in the z-direction, a number of columns "N" in the x-direction and a number of columns "R" in the y-direction.

In the fourth stage 44, the cells are populated with density data. The domain is partitioned into two regions 58, 60 separated by a "half space" 62. For two-dimensional domains, the half space 62 is a line extending along the x-axis. For three-dimensional domains, the half space 62 is a plane extending along the x- and y-axes. In one embodiment, the half space 62 is positioned at a selected depth relative to the surface topology 54. For example, the half space 62 is positioned at a depth corresponding to a lowest depth of the surface topology 54.

In one embodiment, for a two-dimensional domain, each cell thus includes a density value $\rho_{i,j}$, where "i" is a row number 1 through M and "j" is a column number 1 through N. The domain is sectioned into two regions 58 and 60, which are bounded by the half space line 62. A first region 58 includes rows above the half space 62, shown as rows 1 through p, and a second region 60 includes rows below the half space 62, shown as rows r through M.

In another embodiment, for a three-dimensional domain, each cell includes a density value $\rho_{i,j,k}$, where "i" is a row number 1 through M, "j" is an x-axis column number 1 through N and "k" is a y-axis column number 1 through R. The two regions 58, 60 are bounded by a half space plane 62, the first region 58 including rows 1 through p and the second region 60 including rows r through M.

Figure 4:
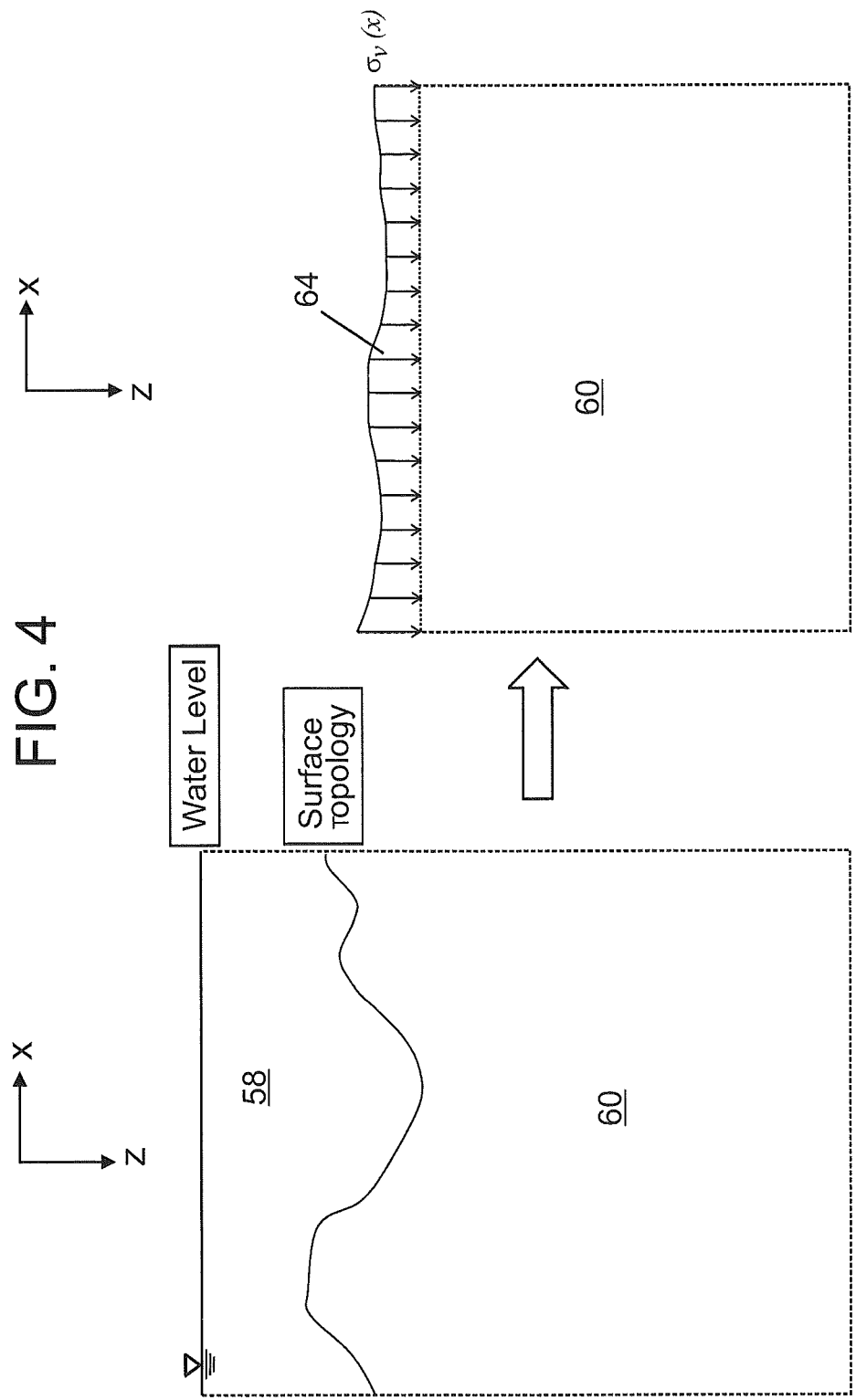
FIG. 4 depicts a cross-sectional view of a domain and a cross-sectional representation of an associated distributed surface load.
Figure 5:
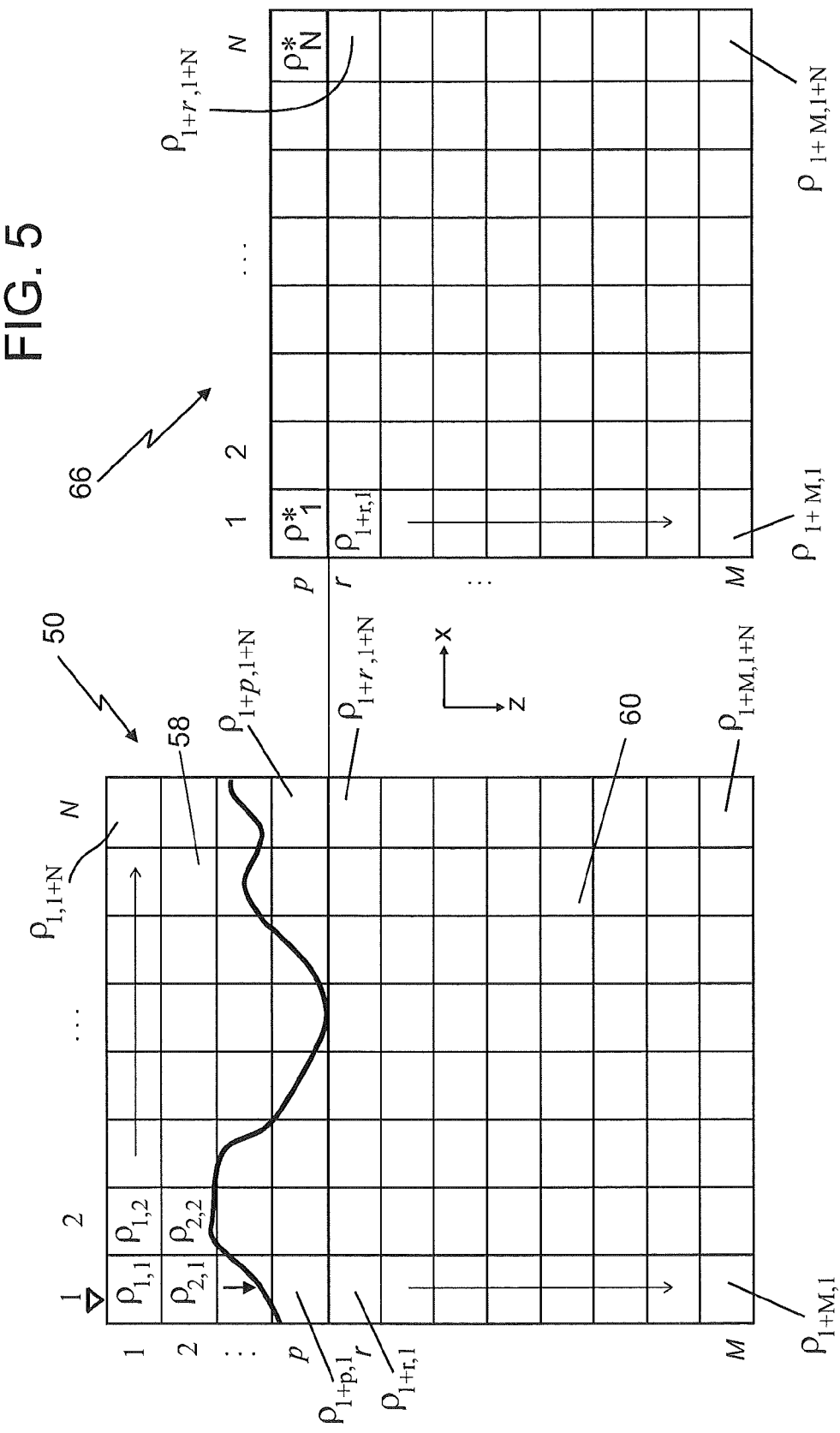
FIG. 5 depicts density data matrices of the domain of FIG. 4.

In the fifth stage 45, referring to FIGS. 4 and 5, the total vertical stress (i.e., overburden stress) in each column in the first region 58 (i.e., above the half space 62) is estimated or calculated, for example, by using vertical integration of the density data. The total vertical stress data is stored and the total vertical stress corresponding to the depth of the half space 62 is applied on the second region 60 as a distributed surface load 64.

Implementation of this stage is shown in FIG. 5. A new discrete domain 66 is created that includes rows p and r through M, and density values in the original domain 50 are transferred to the new discrete domain 66. Density values in the row above depth to half space (row p) are replaced by equivalent density values, ρ*.

In one embodiment, where the domain 50, 66 is two-dimensional, ρ* is represented as "$\rho_i^*$", where:

$$\rho_i^* = S_{p,i}/\Delta z, \quad i=1 \ldots N$$

"$S_{p,i}$" is the total vertical stress value calculated by vertical integration for the first region in each cell (p,i) located in the row p, "Δz" is the vertical dimension of the cell, and N is the number of elements "i" in the x-direction.

In another embodiment, where the domain 50, 66 is three-dimensional, ρ* is represented as "$\rho_{i,j}^*$", where:

$$\rho_{i,j}^* = S_{p,i,j}/\Delta z, \quad i=1 \ldots N, j=1 \ldots R$$

"$S_{p,i,j}$" is the total vertical stress value calculated by vertical integration for the first region 58 in each cell (p,i,j), and "N" and "R" are the number elements "i" and "j" in the x- and y-directions, respectively.

In the sixth stage 46, the gravitational load in each cell is idealized as a point load acting at the bottom center of the cell. The point load location in each cell is exemplary, as other locations such as a center or top center location can be used.

Figure 6:
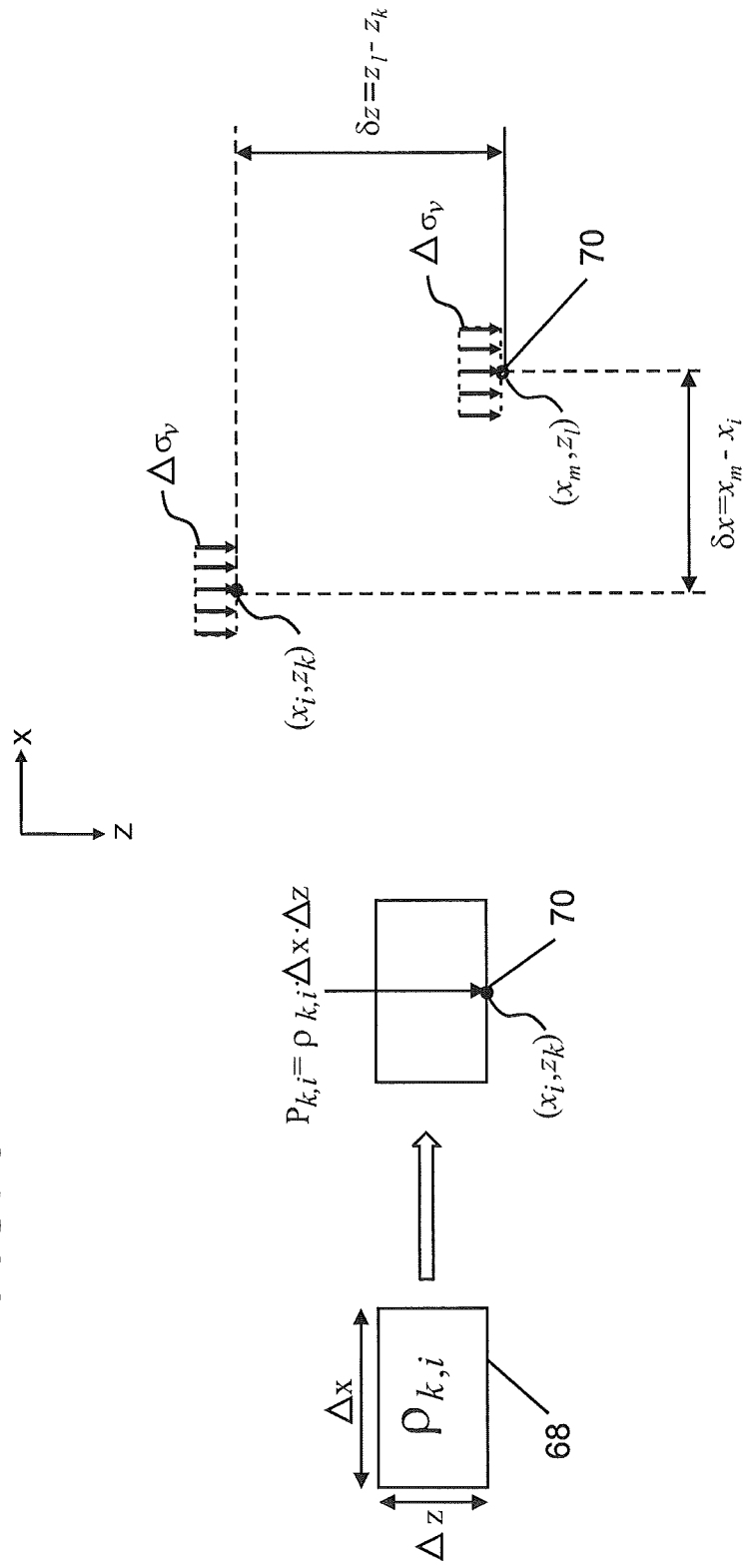
FIG. 6 depicts a cell of a two-dimensional density data matrix and an associated idealized point load.

In one embodiment, shown in FIG. 6, the domain 66 is a two-dimensional domain having a plurality of two-dimensional (such as rectangular) cells 68. In this embodiment, the cell numbers "i" and "k" are the coordinates of each cell 68 in the x-direction and z-direction, respectively, and the density associated with the cell 68 is denoted as "$\rho_{k,i}$". The induced total vertical stress, $\Delta\sigma_v$, at each cell 68 is calculated for a selected point load location 70, designated ($x_i, z_k$). In one embodiment, the total vertical stress $\Delta\sigma_v$ is calculated for a plurality of points ($x_m, z_l$) relative to the selected point ($x_i, z_k$) as:

$$\Delta\sigma_{(v)m,l} = \begin{cases} 0, & z_k > z_l \\ 0, & z_k = z_l \ \& \ x_i \neq x_m \\ \rho_{k,i}\Delta z, & z_k = z_l \ \& \ x_i = x_m \\ \dfrac{2P_{k,i}}{\pi} \cdot \dfrac{\delta z^3}{(\delta x^2 + \delta z^2)^2} & z_l > z_k \end{cases}$$

where "$\Delta\sigma_{(v)m,l}$" is the induced vertical stress at a point ($x_m, z_l$), $x_m$ and $z_l$ are the x- and z-coordinates of each of the plurality of points relative to the cell 68, and $x_i$ and $z_k$ are the x- and z-coordinates of the location of the idealized point load 70. δz is equal to the difference between $z_l$ and $z_k$, and δx is equal to the difference between $x_m$ and $x_i$. $P_{k,i}$ is a vertical point load value at the idealized point and may be calculated as:

$$P_{k,i} = \rho_{k,i} \cdot \Delta x \cdot \Delta z.$$

Δx is a dimension of the cell along the x-axis, and Δz is a dimension of the cell along the z-axis.

Figure 7:
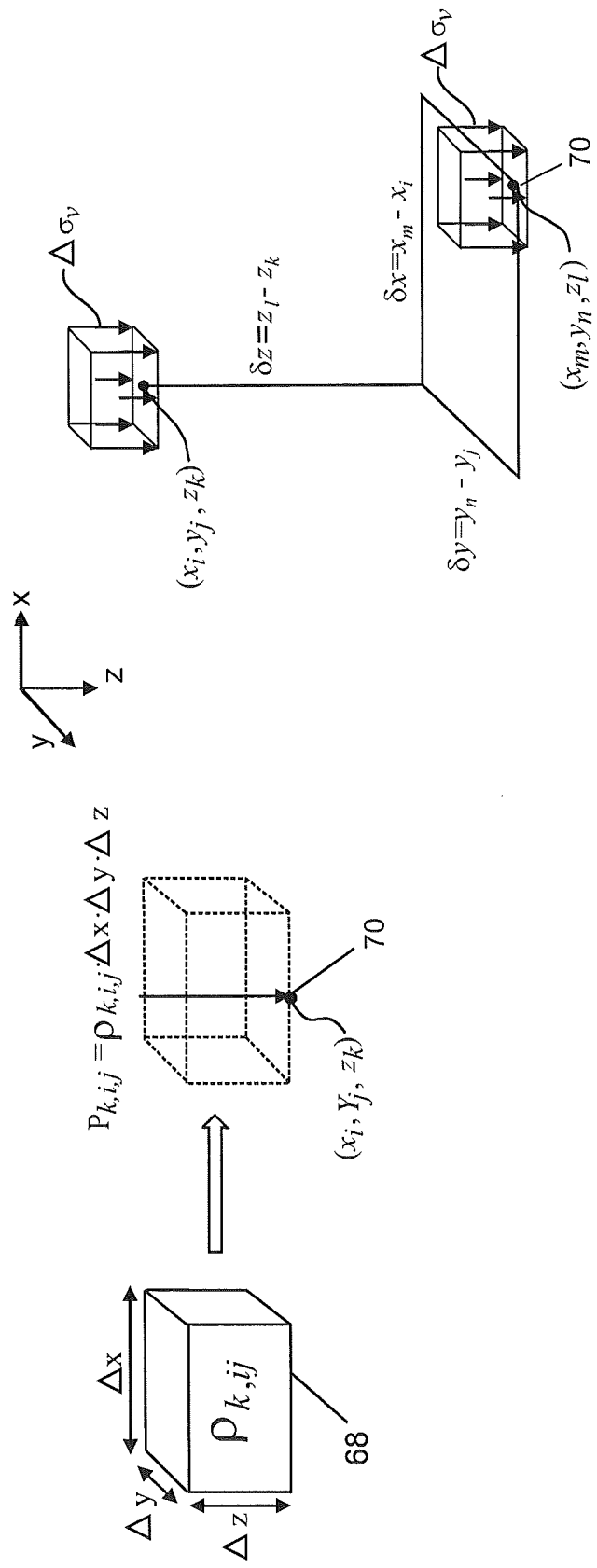
FIG. 7 depicts a cell of a three-dimensional density data matrix and an associated idealized point load.

In another embodiment, shown in FIG. 7, the domain 66 is a three-dimensional domain. In this embodiment, the cell numbers "i", "j" and "k" are the numbers in the x-direction, y-direction and z-direction, respectively, and the density associated with the cell 68 is denoted as "$\rho_{k,i,j}$". The induced total vertical stress, $\Delta\sigma_v$, at each cell 68 is calculated for a selected point load location 70, designated ($x_i, y_j, z_k$). In one embodiment, the total vertical stress $\Delta\sigma_v$ is calculated for a plurality of points ($x_m, y_n, z_l$) relative to the selected point ($x_i, y_j, z_k$) as:

$$\Delta\sigma_{(v)m,n,l} = \begin{cases} 0, & z_k > z_l \\ 0, & z_k = z_l \ \& \ x_i \neq x_m \\ 0, & z_k = z_l \ \& \ y_n \neq y_j \\ \rho_{k,l,j}\Delta z, & z_k = z_l \ \& \ x_i = x_m \ \& \ y_n = y_j \\ \dfrac{3P_{k,i,j}}{2\pi} \cdot \dfrac{\delta z^3}{(\delta x^2 + \delta y^2 + \delta z^2)^{5/2}} & z_l > z_k \end{cases}$$

where $\Delta\sigma_{(v)m,n,l}$ is the induced vertical stress at a point ($x_m, y_n, z_l$), $x_m$, $y_n$ and $z_l$ are the respective x-, y- and z-coordinates of each of the plurality of points relative to the cell 68, and $x_i$, $y_j$ and $z_k$ are the x-, y- and z-coordinates of the location of the idealized point load 70. δz is equal to the difference between $z_l$ and $z_k$, δx is equal to the difference between $x_m$ and $x_i$, and δy is equal to the difference between $y_n$ and $y_j$. $P_{k,i,j}$ is a vertical point load value at the idealized point 70 and may be calculated as:

$$P_{k,i,j} = \rho_{k,i,j} \cdot \Delta x \cdot \Delta y \cdot \Delta z.$$

Δx is a dimension of the cell along the x-axis, Δy is a dimension of the cell along the y-axis, and Δz is a dimension of the cell along the z-axis.

In the seventh stage 47, the total vertical stress $\sigma_v$ at each cell 68 is calculated by summing all of the induced vertical stresses $\Delta\sigma_{(v)m,n,l}$. The total vertical stress $\sigma_v$ for each cell 68 in the first region 58 is merged with the total vertical stress $\sigma_v$ for each cell in the second region 60 to form a complete total vertical stress field of the domain 50.

In the eighth stage 48, effective vertical stress is estimated or calculated based on any suitable method or technique. For example, the effective vertical stress is calculated for a selected cell 68 from interval velocities based on empirical relationships that are calibrated against well-based data.

In the ninth stage 49, the pore fluid pressure is estimated by subtracting the effective vertical stress from the total vertical stress. In one embodiment, the effective vertical stress for a selected cell 68 is subtracted from the total vertical stress $\sigma_v$ for the selected cell 68.

In addition, various other properties of the formation can be estimated using the vertical stress calculations described herein. For example, estimation of horizontal stresses can provide important information regarding the stress distribution and attributes in a formation, allowing for the determination of stresses such as vertical stress, maximum horizontal stress and minimum horizontal stress.

Figure 8:
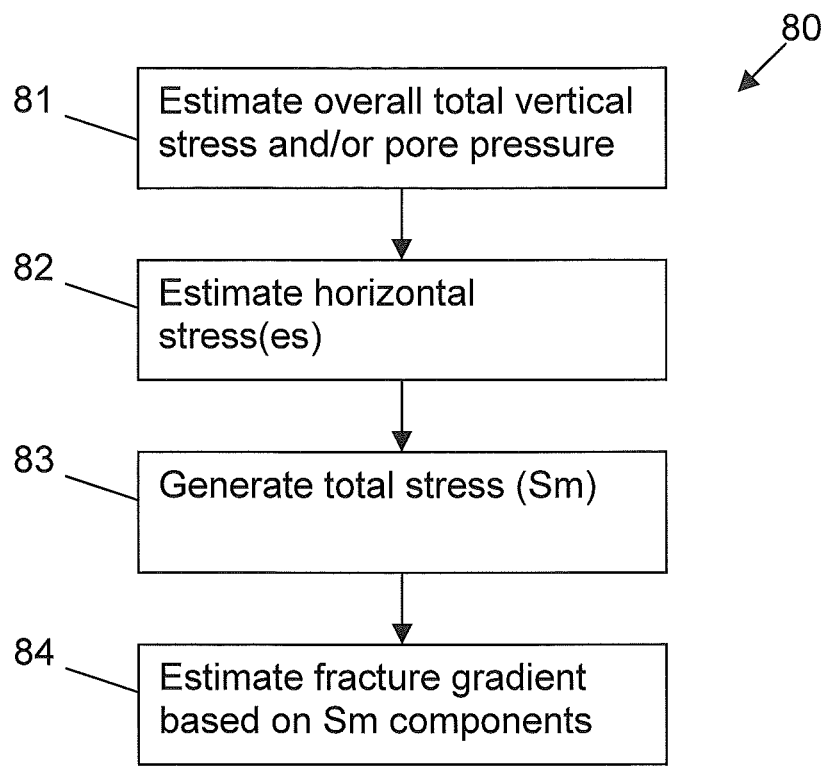
FIG. 8 depicts a flow chart illustrating estimations of various formation properties based on vertical and horizontal stress estimations.

Referring to FIG. 8, in a first stage 81, the total vertical stress and/or pore pressure is estimated, for example, via the method 40. In one embodiment, in a second stage 82, the estimated total vertical stress and pore fluid pressure are used to estimate horizontal stresses. Total maximum and total minimum horizontal stresses can be calculated as:

$$ESR(\min) = (Sh\min - Pp)/(Sv - Pp),$$

$$ESR(\max) = (SH\max - Pp)/(Sv - Pp),$$

where "ESR(min)" is the effective stress ratio for minimum horizontal stress, "ESR(max)" is the effective stress ratio for maximum horizontal stress, "Pp" is the pore fluid pressure, "Shmin" is the total minimum horizontal stress, "SHmax" is the total maximum horizontal stress, and "Sv" is the total vertical stress. In one embodiment, Shmin and SHmax are estimated for each cell 68, and Sv is the total vertical stress calculated for each cell 68. In this way a stress field for the formation, corresponding for example to the domain 60 and/or 66, can be generated.

ESR(min) and ESR(max) can be estimated or derived from various techniques and sources. For example, the ESR(min) and ESR(max) profiles are calibrated using regional experience (i.e., known ESR profiles for different geographical regions) and/or information gathered from available off-set wells in the same or similar area as the borehole 14 is used to measure formation properties.

In one embodiment, horizontal stresses are calculated based on analytical or numerical calibration curves. Such calibration curves may be used, for example, if there is limited data from nearby off-set wells, knowledge of ESR profiles in a region is limited, or if available geologic models involve complex structures. In one example, assuming that the gravity field is generally constant and the deviations of pore pressure from its local average are negligible or can be assumed to be negligible, Shmin and SHmax profiles can be calculated utilizing appropriate transforms or operators, such as:

$$\nabla^2[Sm]=0, \quad (a)$$

where $Sm=Sx+Sy+Sz$ and $\nabla^2=\partial^2/\partial x^2+\partial^2/\partial y^2+\partial^2/\partial z^2$.

"Sm" is the sum of the stresses at a given point or cell 68, and "Sx", "Sy" and "Sz" are defined as stress components in the direction of the x, y, and z axes, respectively, for a given coordinate system in which one axis, e.g., the y axis, is parallel to the gravitational field. In one embodiment, the axes correspond respectively to the total vertical stress, the minimum total horizontal stress and the maximum total horizontal stress. The operators and coordinate systems are not limited to those described herein.

Equation (a) can be solved numerically to estimate a Sm field, i.e., Sm values at each point or cell 68 within the domain 60 and/or 66. Boundaries of the domain are defined, such as lateral boundaries, the bottom of the formation model area or domain, the surface boundary, and/or the boundary of a salt body or other formation. In one embodiment, the Sm values at each of these boundaries are inputted by a user. Based on the boundary values, Sm values can be calculated at each point or cell 68, and the horizontal stresses can be derived from the Sm values by using the total vertical stress calculated as described above.

In one embodiment, fracture gradients are estimated based on at least the total vertical stresses and the total minimum horizontal stresses. For example, in a third stage 83, a total stress (Sm) field is generated by estimating the stress components (e.g., Sx, Sy and Sz) at each point or cell 68 in the domain 60 and/or 66. In one embodiment, the stress components include the total vertical stress, the minimum horizontal stress and the maximum horizontal stress. In a fourth stage 84, a fracture gradient value at each point or cell 68 is estimated as the value of the stress component having the lowest magnitude of all stress components at the point or cell 68. This fracture gradient may then be used to calculate the estimated fracturing pressure, i.e., pressure needed to induce a fracture in the formation, at each point or cell 68.

Estimation of the stresses as described herein may improve the accuracy of total stress and pore pressure estimations and thus, the accuracy of services such as wellbore stability analysis, fault seal analysis, sand production predictions and compaction/subsidence analysis. For example, estimations of pore pressures, overburden stresses, fracture gradients and horizontal stresses can be used in developing a geologic model useful in wellbore stability analyses and predicting sand production. These estimations may also be used in producing models and estimates to predict subsurface compaction and any corresponding surface subsidence due to removal of fluids and other materials from a formation.

In one embodiment, the stress field information described herein is utilized in conjunction with estimating formation acoustic velocities. The stress field information may be used to update or correct velocity data and/or a velocity model of a formation. For example, after calculating a total stress (Sm) field and a pore pressure field for the domain 60 and/or 66, acoustic velocity fields for the domain can be corrected by applying an empirically or theoretically driven, mean effective-stress dependent correction factor.

Figure 9:
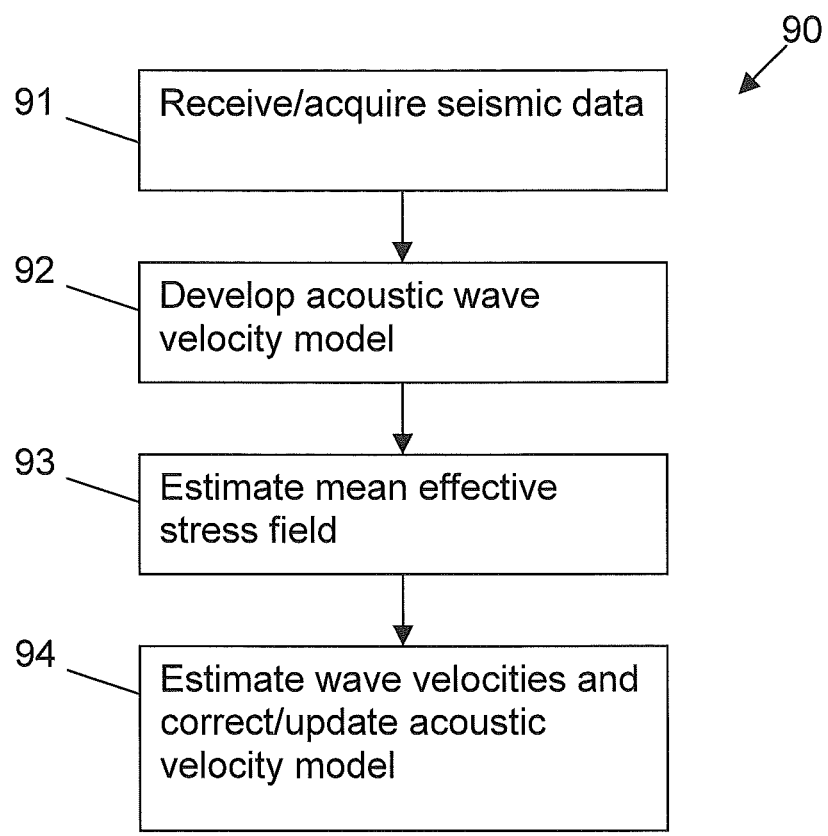
FIG. 9 depicts a flow chart providing an exemplary method of producing and/or correcting formation acoustic velocity data.

Referring to FIG. 9, an exemplary method of producing and/or correcting formation acoustic velocity data includes one or more stages 91-94. In the first stage 91, seismic data is received for a formation, such as the formation represented by the domain 60 and/or 66. Seismic data is acquired by, for example, seismic detectors disposed in the tool 22, which detect seismic signals generated by one or more seismic sources disposed on the surface or at other locations within the borehole and/or formation. Effective stress variations influence wave propagation through a formation and thus influence seismic velocities. Stress estimations as described herein can be used to update seismic velocities and travel times.

In the second stage 92, a velocity model of the subsurface formation (e.g., the domain 60 and/or 66) is developed utilizing the seismic data. The total stress (e.g., Sm) and pore pressure fields are estimated as described herein. In the third stage 93, a mean effective stress field is estimated based on the total stress and pore pressure fields as described above, for example, by subtracting the pore pressure from the total stress at each point or cell 68 in the domain.

In the fourth stage 94, the mean effective stress is used to update seismic velocities and travel times through the formation. In one embodiment, a mean effective stress dependent velocity correction function is adopted. For example, Hertz-Mindlin's expression is used to calculate a wave velocity:

$$V=V_o\times(1+\Delta\sigma_{(m)}/\sigma_{o(m)})^h, \quad (b)$$

where "V" is an estimated P- (or S-) wave velocity, "$V_o$" is the initial P- (or S-) wave velocity, "$\sigma_{o(m)}$" is the initial mean effective stress, "$\Delta\sigma_{(m)}$" is the change in the mean effective stress, and "h" reflects the asperity in an acoustic contact area. The contact area coefficient "h" may be derived from experimental data or a theoretical value (e.g., ⅙) for the coefficient h can be used. In one embodiment, if well data is available, the modified velocity model as well as equation (b) is calibrated against well data. In one embodiment, the velocity model and stress estimations are used to estimate the amount of wave velocity changes due to stress perturbations around large salt bodies or other formations. For example, changes in the stress components of Sm can be used to estimate changes in seismic velocities.

As described herein, "drillstring" or "string" refers to any structure or carrier suitable for lowering a tool through a borehole or connecting a drill bit to the surface, and is not limited to the structure and configuration described herein. For example, the string 12 is configured as a hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The apparatuses and methods described herein provide various advantages over existing methods and devices, in that the apparatuses and methods produce described herein result in superior pore fluid pressure predictions and improved calculation methods as compared to prior art techniques.

The pore pressure prediction methods described herein provide an improvement in workflows pertaining to calculation of formation stresses, pressures and other properties. For example, the improvement in the total vertical stress, i.e. overburden stress, calculation provides an improvement in any related workflow. In addition, most of the currently used methods start with calculation of total vertical or overburden stress. Thus, the methods described herein improve not only pore pressure prediction workflows but also other workflows such as estimation of total horizontal stresses.

Prior art methods calculate pore fluid pressure and generally estimate total vertical stress by vertical integration of density data. Such integration cannot capture the decay of the effect of topology and heterogeneities as a function of depth, and thus these prior art methods can lead to unrealistic pore fluid pressure predictions and unrealistic input for borehole stability predictions during drilling and production. In contrast, the apparatuses and methods described herein produce results that reflect the decay with depth of the total vertical stress, and thus produce more accurate and realistic results.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for estimating stress in an earth formation, the system comprising:
   a tool configured to at least one of generate and receive density information for the earth formation, the tool configured to perform:
   generating a domain including at least a portion of the earth formation based on sensor data for the formation;
   discretizing the domain into a plurality of cells, each cell of the plurality of cells including a respective density value being representative of a selected location in the domain;
   dividing the domain including at least the portion of the earth formation into a first region and a second region, the first region including a surface topology of the earth formation and including a plurality of columns, each column having a vertical array of cells;
   estimating a first vertical stress in the first region and representing the first vertical stress in each column as at least one point load;
   estimating a second vertical stress in the second region by a point load based method using the first vertical stress, and associating each cell in the second region with a vertical stress value representing the point load; and
   estimating at least one horizontal stress based on the second vertical stress, wherein estimating includes calculating an induced vertical stress value at a plurality of locations within each cell relative to the point load location, summing the induced vertical stress values to generate a total vertical stress for each cell, and calculating the at least one horizontal stress based on the total vertical stress.

2. The system of claim 1, wherein estimating the second vertical stress includes estimating a point load for the second vertical stress in each cell in the second region, and estimating the at least one horizontal stress includes estimating the at least one horizontal stress in each cell.

3. The system of claim 1, wherein estimating the first vertical stress includes vertically integrating the respective density values in the first region.

4. The system of claim 1, wherein the tool is configured to further perform estimating at least one of force, pressure, pore pressure and effective vertical stress based on the second vertical stress.

5. The system of claim 1, wherein the tool is configured to further perform estimating a fracture gradient based on the second vertical stress and the at least one horizontal stress.

6. The system of claim 1, wherein the tool is configured to further perform estimating an acoustic wave velocity value based on the second vertical stress and the at least one horizontal stress.

7. The system of claim 1, wherein the first vertical stress is based on measurements of formation density in the first region.

8. The system of claim 1, wherein the first vertical stress is based on a vertical integration of the respective density values in the vertical array of cells in each column.

9. The system of claim 4, wherein the at least one horizontal stress is estimated based on the second vertical stress and the pore pressure.

10. The system of claim 6, wherein the wave velocity value is calculated based on the following equation:

$$V = V_o \times (1 + \Delta\sigma_{(m)}/\sigma_{o(m)})^h,$$

where V is the wave velocity value, $V_o$ is an initial wave velocity value, $\sigma_{o(m)}$ is an initial mean effective stress, $\Delta\sigma_{(m)}$ is a change in the mean effective stress, and h reflects a contact area asperity.

11. The system of claim 9, wherein the at least one horizontal stress includes a total maximum horizontal stress and a total minimum horizontal stress.

12. The system of claim 11, wherein the total maximum horizontal stress and the total minimum horizontal stress are calculated based on the following equation:

$$ESR(min) = (Shmin - Pp)/(Sv - Pp),$$

$$ESR(max) = (SHmax - Pp)/(Sv - Pp),$$

where ESR(min) is an effective stress ratio for the minimum horizontal stress, ESR(max) is an effective stress ratio for the maximum horizontal stress, Pp is the pore pressure, Shmin is the total minimum horizontal stress, SHmax is the total maximum horizontal stress, and Sv is the total vertical stress.

* * * * *